United States Patent
Kao et al.

(10) Patent No.: US 9,328,024 B2
(45) Date of Patent: May 3, 2016

(54) APPLICATION OF HIGH TOUGHNESS, LOW VISCOSITY NANO-MOLECULAR RESIN FOR REINFORCING POTHOLE PATCHING MATERIALS IN ASPHALT AND CONCRETE BASE PAVEMENT

(75) Inventors: Wei H. Kao, Rancho Palos Verdes, CA (US); Larry Carlson, Santa Clarita, CA (US); Jenn-Ming Yang, Encino, CA (US); Jiann-Wen Woody Ju, Calabasas, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 246 days.

(21) Appl. No.: 13/096,750

(22) Filed: Apr. 28, 2011

(65) Prior Publication Data

US 2011/0293954 A1    Dec. 1, 2011

Related U.S. Application Data

(60) Provisional application No. 61/329,505, filed on Apr. 29, 2010.

(51) Int. Cl.
| | | |
|---|---|---|
| *C04B 26/26* | (2006.01) | |
| *C04B 28/04* | (2006.01) | |
| *C04B 28/02* | (2006.01) | |

(Continued)

(52) U.S. Cl.
CPC ............... *C04B 28/04* (2013.01); *C04B 26/26* (2013.01); *C04B 28/02* (2013.01); *C04B 28/08* (2013.01); *C04B 28/14* (2013.01); *C04B 28/24* (2013.01); *C04B 41/009* (2013.01); *C04B 41/4857* (2013.01); *C04B 41/63* (2013.01); *E01C 7/18* (2013.01); *E01C 7/35* (2013.01); *C04B 2103/0048* (2013.01); *C04B 2111/0075* (2013.01); *C04B 2111/70* (2013.01); *C04B 2111/72* (2013.01); *Y02W 30/92* (2015.05);

(Continued)

(58) Field of Classification Search
None
See application file for complete search history.

(56) References Cited

U.S. PATENT DOCUMENTS

| | | | | |
|---|---|---|---|---|
| 4,357,449 A | | 11/1982 | Yi | |
| 4,915,539 A | * | 4/1990 | Yoshikane et al. | ............... 404/31 |

(Continued)

FOREIGN PATENT DOCUMENTS

| | | |
|---|---|---|
| CN | 1249314 A | 4/2000 |
| CN | 101068883 A | 11/2007 |

(Continued)

OTHER PUBLICATIONS

Cure Kinetics of ROMP of DCPD Kessler JI of Polymer Science 40 2373-2383 (2002).*

(Continued)

*Primary Examiner* — Kenneth Stachel
(74) *Attorney, Agent, or Firm* — Foley & Lardner LLP; Cliff Z. Liu

(57) ABSTRACT

Described herein are methods of improving the durability of concrete by the infusion of the concrete with a low-viscosity oligomeric solution, and subsequent curing of the oligomeric solution to form a high toughness polymer. Also described herein are compositions containing concrete and high toughness polymers, and formed articles made from concrete and high toughness polymers. The methods and compositions are useful for improving the durability of concrete roads and structures, as well as the durability of repairs to concrete roads.

9 Claims, 1 Drawing Sheet

(51) Int. Cl.
  *C04B 28/08* (2006.01)
  *C04B 28/14* (2006.01)
  *C04B 28/24* (2006.01)
  *C04B 41/00* (2006.01)
  *C04B 41/48* (2006.01)
  *C04B 41/63* (2006.01)
  *E01C 7/18* (2006.01)
  *E01C 7/35* (2006.01)
  *C04B 103/00* (2006.01)
  *C04B 111/00* (2006.01)
  *C04B 111/70* (2006.01)
  *C04B 111/72* (2006.01)

(52) U.S. Cl.
  CPC ......... *Y02W 30/94* (2015.05); *Y10T 428/31667* (2015.04)

(56) References Cited

U.S. PATENT DOCUMENTS

| | | | |
|---|---|---|---|
| 6,221,935 B1 | 4/2001 | Hashimoto et al. | |
| 6,362,257 B1 * | 3/2002 | Chehovits et al. | 524/59 |
| 7,811,566 B2 | 10/2010 | Arakawa et al. | |
| 2002/0098362 A1 * | 7/2002 | Mushovic | 428/413 |
| 2003/0186035 A1 * | 10/2003 | Cruce et al. | 428/292.4 |
| 2004/0010091 A1 * | 1/2004 | Paquet et al. | 525/386 |
| 2006/0052487 A1 | 3/2006 | Cruce et al. | |
| 2008/0023884 A1 * | 1/2008 | Konze et al. | 264/328.1 |
| 2009/0043059 A1 * | 2/2009 | Liaw et al. | 526/171 |
| 2009/0061236 A1 * | 3/2009 | Walther et al. | 428/440 |
| 2012/0071605 A1 * | 3/2012 | Baugh et al. | 525/75 |

FOREIGN PATENT DOCUMENTS

| | | | | |
|---|---|---|---|---|
| CN | 101338062 A | 1/2009 | | |
| CN | 102046679 A | 5/2011 | | |
| EP | 0 374 576 | 6/1990 | | |
| KR | 100789572 B1 * | 12/2007 | | C08L 95/00 |

OTHER PUBLICATIONS

English language machine translation of KR 10-0789572 KIPO (2007).*
"US Commerce Department's National Institute of Standards and Technology Invests up to $71 Million in New Manufacturing, Infrastructure Research and Development." Public & Business Affairs, 6 pages (Dec. 15, 2009).
Yuan et al., "Development of High-Toughness Low-Viscosity Nano-Molecular Resins for Reinforcing Pothole Patching Materials." Nondestructive Characterization for Composite Materials, Aerospace Engineering, Civil Infrastructure, and Homeland Security (2011).
International Search report and Written Opinion dated Nov. 28, 2012 in PCT application PCT/US2012/035602, 12 pages.
Certification and Partial English Translation of Korea Registration No. 10-0789572, dated Nov. 13, 2015, 9 pages.

* cited by examiner

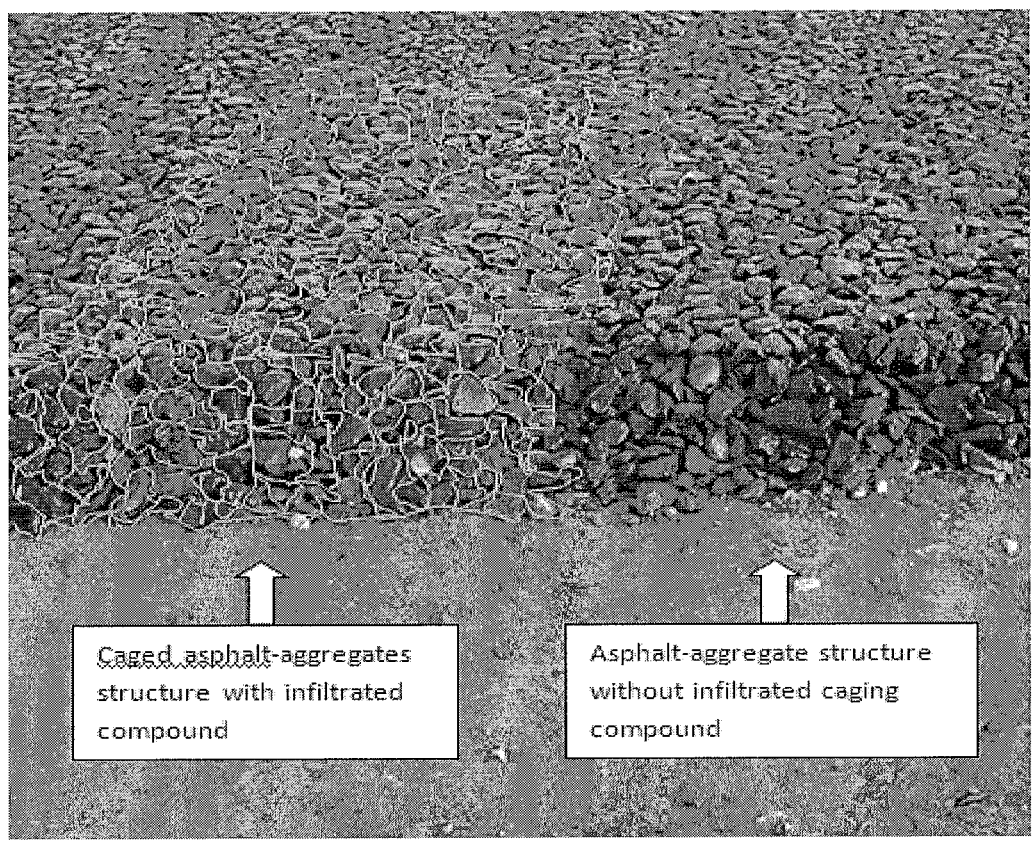

APPLICATION OF HIGH TOUGHNESS, LOW VISCOSITY NANO-MOLECULAR RESIN FOR REINFORCING POTHOLE PATCHING MATERIALS IN ASPHALT AND CONCRETE BASE PAVEMENT

CROSS-REFERENCE TO RELATED APPLICATION

This application claims the benefit of U.S. provisional application No. 61/329,505 filed Apr. 29, 2010, the disclosure of which is incorporated herein by reference in its entirety.

STATEMENT REGARDING FEDERALLY SPONSORED RESEARCH OR DEVELOPMENT

This invention was made with Government support under 70NANB10H019, awarded by the Department of Commerce—NIST. The Government has certain rights in the invention.

BACKGROUND OF THE INVENTION

Damage to concrete structures such as roads, runways, bridges, and even buildings is a chronic problem around the world. The natural erosion processes in combination with pollution and/or heavy use have a severe impact on the life of these structures.

Surface damage in concrete roads can result from a number of causes—frost damage, late finishing, toweling-on of a "topping" layer after the main slab has been compacted and found to be low, or mechanical damage, caused for example by vehicles. Concrete can have high void content that can allow moisture to enter the surface and when frozen, produce tensile stresses that result in scaling and cracking of the surface. Additionally, concrete surfaces can scale as a result of using de-icing agents for ice and snow removal. The application of a de-icing agent to a pavement that is already covered in snow or ice will cause the surface to lose heat rapidly. This melts the ice on the surface, but can cause freezing of any moisture that has become trapped in the material, potentially damaging it.

The occurrence of potholes on asphalt and cement pavements have been long standing issues for all transportation agencies in this country as well as around the world. Over the years, improvements in materials, repair deployment methods, and supporting deployment systems have greatly helped to make repairs more durable and economic. However, the life of repaired potholes normally still is counted in terms of days or months, rather than years. The cost of pothole repair to the city and state transportation and maintenance departments and federal agencies are in the range of millions dollars per year. In addition, the existence of potholes presents a great safety hazard to vehicles, structures, and pedestrians. A driver's inherent reaction to veer away from a pothole often presents a danger to nearby vehicles and pedestrians and can cause serious traffic disturbances.

It is felt that the dominating mechanisms in forming potholes are different under different weather or environment conditions, although the presence of water in the sub-base serves as a major reason for potholes formation. Potholes are generally caused by moisture and water percolates through fissures in pavement and collects in the sub-base of the pavement. In colder climates, the subsequent freeze-thaw action pushes the pavement upward while traffic stresses the pavement and a breakdown of the road surface causes a material collapse that forms the pothole. Alternatively, in warmer areas, the freeze-thaw cycle plays a less important role. In places such as Florida, temperature and the impact of water on the integrity of the road material and subsurface combine to reduce the integrity of the surface and lead to its compromise. Additionally, traffic, poor construction, aged concrete, or a combination of these factors also play a role in all areas. Therefore, by limiting the amount of water that percolates through fissures in the road or any subsequent repairs, the deleterious effects of moisture on road quality can be mitigated.

It is felt that the failure and short life of the pothole repairs are due to the creation of precursor cracks as the result of low toughness, low rutting resistance and low strength of the repairs materials. The moisture further assisted the debonding of the binders within the aggregates within the repair material, and the repair materials with the base of the pavement. Therefore, by increasing the dynamic toughness and strength, and eliminate the voids that existed in the repair mixtures which provide paths for moisture penetration, the pothole repair life can be improved substantially.

Similarly, buildings, bridges and other concrete structures are continually impacted by weathering processes primarily catalyzed by water. Water can cause spalling and damage to surfaces of bridges and buildings, exposing structural components, such as steel beams and rebar, that may be further damages and cause even more erosion to the concrete. Further, acid rain can not only cause ugly discoloration to building facades, but also cause significant damage and deterioration to concrete buildings, bridges, and other concrete surfaces, as the acidic solution dissolves the calcium hydrates in the cement. As the current highway system in the United States is both vast and aging, there is clearly a need to find a way to cost-effectively protect the roads and bridges that make up our infrastructure.

On method that has been used for asphalt concrete is polymer modified asphalt ("PMA"). PMA has become common in road paving and roofing and may represents much as 20% of all asphalt used today. Improvements in rutting resistance, thermal cracking, fatigue damage, stripping, and temperature susceptibility have led polymer modified binder to be substituted for asphalt in many paving applications, including hot mix, cold mix, chip seals, hot and cold crack filling, patching, and slurry seal. PMAs are used wherever performance and durability are desired. Asphalt specifiers are finding that many of the Superpave binder grades (Superpave, which stands for Superior Performing Asphalt Pavements, represents an improved, standardized system for specifying, testing, and designing asphalt materials) need polymer modification to meet all the requirements for high temperature rutting resistance and thermal cracking resistance at low temperatures.

A typical design of pothole repair is to raise the surface above that of the road surface, and to overlay the material directly over the road surface, around the perimeter of the repair. This is done to prevent the intrusion of water. Further, the overlaid area must be of sufficient thickness so that fractures do not occur, which can break and dislodge pieces of the repair. While it would be safer to make the repair flush with the road surface, absent a firm watertight bond, this is not possible. It would be desirable to produce a repair that does not produce a bump that can adversely affect motorists. It would further be desirable to have a repair material that does not compress with traffic so that it can be set at the desired height without fear of changing over time.

A typical practice with asphalt repair is to wait long enough for the material to cool sufficiently to harden enough to permit traffic. This can result in long down-times that can be disruptive and costly. It would be an advantage to have a quick-curing thermoset that permits road opening without damage in a relatively short time.

A typical design practice is to raise the pothole repair material above the road surface temporarily, and to count on traffic to reduce it to its desired final height. This can be difficult to estimate, as it can be inexact how much the repair will settle, and in how much time. Weather can be an important variable here, as asphalt repairs settle more and more quickly with heat. It can be appreciated that a repair that ends up too high can cause an unsafe bump for motorists, and a repair that ends up too low can cause pooling of water. It would be an advantage to have a repair material that does not appreciably change after its installation, simplifying the design and removing uncertainty.

Traditionally, polymers used for asphalt modification were typically thermoplastic polymers that could be added to the mix as solids. Normally, such polymer addition involved adding the solid polymer, possibly after grinding, to a rear-shear mixing vessel containing asphalt generally heated above 325° F. for a period of time to assure thorough mixing. However, this tended to be a labor and capital intensive process.

Despite the benefits of adding polymers to asphalt to improve physical and mechanical performance, the polymers currently in use may not optimize asphalt performance. Also, the cost of adding polymers to the asphalt at levels sufficiently high to meet desired specifications can be prohibitive. As a result, the industry has looked for ways to enhance the performance of the polymer modifiers, such as the development of additional chemical agents. Many of these agents have been termed crosslinkers and are believed to either crosslink the polymer to the asphaltene component of the asphalt or crosslink the polymer and improve properties. However, the incorporation of polymers and other components into the asphalt can cause numerous problems that compromise the requisite asphalt properties. Further, these methods are incompatible for use with cement concrete. It is therefore desirable to develop technologies and methods for adding polymers to concrete that produce a concrete with improved durability that doesn't compromise the necessary properties of the material.

SUMMARY OF THE INVENTION

In accordance with one embodiment, the present invention is directed to methods of increasing the durability of concrete and concrete structures by incorporating polymers into the structure of the concrete. The infusion into the concrete of a low viscosity, fast curing oligomeric solution comprising a nanomolecular precursor and subsequent polymerization of the monomer into a polymer with high toughness provides increased strength and durability to the concrete as well as providing a barrier to the entry of moisture and chemicals that cause degradation of the surface.

In accordance with another embodiment, the present invention is directed to methods of increasing the durability of concrete and concrete structures by incorporating thermoset polymers into the structure of the concrete. The infusion into the concrete of a low viscosity, fast curing oligomeric solution comprising a nanomolecular precursor and subsequent polymerization of the monomer into a thermoset polymer with high toughness provides increased strength to the concrete as well as providing a barrier to the entry of moisture and chemicals that cause degradation of the surface. In some embodiments, the thermoset polymer is a polymer formed by ring opening methathesis polymerization. Specific examples include polydicyclopentadiene and polynorbornene.

In accordance with another embodiment, the present invention is directed to compositions comprising concrete and polymers formed by ring opening metathesis polymerization. The compositions of the embodiments of the present invention form highly durable materials that are resistant to moisture intercalation and have improved resistance to degradation caused by weather or use.

In accordance with another embodiment, the present invention is directed to formed articles comprising concrete and polymers formed by ring opening metathesis polymerization. Formed articles of embodiments of the present invention can be used, for example, in the building or reinforcement of structures, such as buildings or bridges, may be used as structures or barriers to reinforce military or secure areas, for concrete barriers on highways, or may be used as new or replacement sections of roads.

BRIEF DESCRIPTION OF THE DRAWINGS

FIG. 1. Schematic illustration of aggregate-asphalt mix infiltrated with polyDCPD to form a hardened continuous network within. While the figure depicts asphalt concrete and its repairs, the method applies equally to cement concrete and its repairs.

DETAILED DESCRIPTION OF THE INVENTION

Overview

In a first embodiment, the present invention comprises a method of increasing the strength and/or durability of concrete comprising infusing said concrete with a oligomeric solution having a viscosity of less than about 200 cps and curing in less than about 24 hours, comprising a nanomolecular precursor, and optionally a solvent, optionally a catalyst, optionally an accelerator, and/or, optionally an initiator; and forming a polymer having a toughness of greater than 6.0 ft-lbs/in as measured by Notched Izod Impact Toughness.

In another embodiment, the nanomolecular precursor comprises an olefin, ester, urethane, imide, melamine, urea-formaldehyde, silicone, phenol, maleimide, or epoxide. In some embodiments, the nanomolecular precursor comprises a cyclic olefin. In another embodiment, the nanomolecular precursor comprises a cyclic olefin that undergoes ring opening metathesis polymerization ("ROMP"). In another embodiment, the nanomolecular precursor comprises a five-, six-, seven-, eight-, nine-, ten-, or n-membered cyclic olefin that is bridged or unbridged, that may include two or more fused rings, and undergoes ring opening metathesis polymerization, where n is an integer, such as in the range of 5 to 20, 5 to 15, or 5 to 10. In another embodiment, the nanomolecular precursor comprises a mixture of monomers, dimers, trimers, and/or tetramers of cyclic olefins that undergo ROMP, and where the mixture of two or more of these is used to control the reaction speed. In another embodiment, the nanomolecular precursor comprises a mixture of monomers, dimers, and/or trimers of cyclopentadiene (i.e., DCPD or $C_{10}H_{12}$) or norbornene (i.e., $C_7H_{10}$) and where the mixture of two or more of these is used to control the reaction speed.

In another embodiment, the nanomolecular precursor comprises a combination of monomers, dimers, and/or trimers of a cyclic olefin with one or more additional monomer types. In some embodiments, the additional monomer comprises an ester, an epoxy, and/or an olefin. In some embodiments, the cyclic olefin comprises DCPD or norbornene. In some embodiments, the cyclic olefin comprises DCPD. In some embodiments, the additional monomer comprises butadiene or ethylene.

In another embodiment, the oligomeric solution further comprises a solvent. In some embodiments the solvent is a non-aqueous solvent, In some embodiments, the solvent is an organic solvent. In some embodiments the solvent is an alkene. Examples of alkenes include styrene, ethylene, and butadiene.

In some embodiments, the oligomeric solution further comprises a catalyst. In some embodiments, the catalyst is a ROMP catalyst. In some embodiments, the catalyst is a ruthenium or molybdenum catalyst. In some embodiments, the catalyst is a Grubbs-type catalyst. In some embodiments, the catalyst is a Schrock-type catalyst. In some embodiments, the catalyst is a Piers-type catalyst. In some embodiments, the catalyst is a Hoveyda-type catalyst. In some embodiments, the catalyst is a Hoveyda-Grubbs-type catalyst. In some embodiments, the catalyst is a "black box" catalyst. In some embodiments, the catalyst is a titanocene-based catalyst.

In another embodiment, the oligomeric solution further comprises an accelerator, curing agent, inhibitor, and/or promoter. In some embodiments, additional additives may be present. Additional additives that may be present include, but are not limited to, processing aids, adhesion components, inorganic materials, fillers, and lubricants.

In another embodiment, the oligomeric solution has a viscosity no greater than about 200 cps, 180 cps, 160 cps, 150 cps, 140 cps, 130 cps, 120 cps, 110 cps, 100 cps, 90 cps, 80 cps, 70 cps, 60 cps, 50 cps, 40 cps, 30 cps or 20 cps. In another embodiment, the oligomeric solution cures in less than about 12 hours, less than 10 hours, less 8 hours, less than 6 hours, less than 4 hours, less than 2 hours, less than 1 hours, less than 30 minutes, less than 15 minutes, less than 10 minutes, less than 5 minutes, less than 1 minute, less than 30 seconds, less than 1 second, or about 1 second or less. Further, in another embodiment, the oligomeric solution cures in about 24 hours, 18 hours, 12 hours, 10 hours, 8 hours, 6 hours, 5 hours, 4 hours, 3 hours, 2 hours, 1 hour, 30 minutes, 15 minutes, 10 minutes, 5 minutes, 2 minutes, 1 minute, 30 seconds, 15 seconds, 10 seconds, 1 second, 0.5 seconds. In another embodiment, the oligomeric solution cures from about 1 minute to about 24 hours, from about 1 minute to about 12 hours, from about 1 minute to about 8 hours, from about 1 minute to about 6 hours, from about 1 minute to about 4 hours, from about 1 minute to about 2 hours, from about 1 minute to about 1 hour, from about 1 minute to about 30 minutes, from about 1 minute to about 15 minutes, from about 1 minute to about 10 minutes, from about 1 minute to about 5 minutes, from about 10 minutes to about 24 hours, from about 10 minutes to about 12 hours, from about 10 minutes to about 8 hours, from about 10 minutes to about 6 hours, from about 10 minutes to about 4 hours, from about 10 minutes to about 2 hours, from about 10 minutes to about 1 hour, from about 10 minutes to about 30 minutes, from about 30 minutes to about 24 hours, from about 30 minutes to about 12 hours, from about 30 minutes to about 8 hours, from about 30 minutes to about 6 hours, from about 30 minutes to about 4 hours, from about 30 minutes to about 2 hours, from about 30 minutes to about 1 hour, from about 1 hour to about 24 hours, from about 1 hour to about 12 hours, from about 1 hour to about 8 hours, from about 1 hour to about 6 hours, from about 1 hour to about 4 hours, from about 1 hour to about 2 hours, from about 2 hours to about 24 hours, from about 2 hours to about 12 hours, from about 2 hours to about 8 hours, from about 2 hours to about 6 hours, or from about 2 hours to about 4 hours.

In another embodiment, the polymer formed comprises a thermoset or thermoplastic polymer. In some embodiments, the polymer formed comprises a thermoset polymer. In some embodiments, the polymer formed comprises a thermoplastic polymer. In some embodiments, the polymer comprises a copolymer or a composite. In some embodiments, the copolymer or composite is a thermoset polymer. In some embodiments, the copolymer or composite is a thermoplastic polymer. In some embodiments, the polymer is a polyolefin, polyester, polyurethane, polyimide, poly(melamine-co-formaldehyde), poly(urea-formaldehyde), silicone, polyphenol, poly(maleimide-amide), epoxide, or polydicyclopentadiene. In some embodiments, the polymer is formed from a cyclic olefin. In some embodiments, the polymer is a polymer formed by ROMP. In some embodiments, the polymer is polyDCPD. In some embodiments the polymer is polynorbornene.

In another embodiment, the polymer has a toughness of at least about 2.0, 3.0, 4.0, 5.0, 6.0, 7.0, 8.0 or 9.0 ft-lb/in as measured by Notched Izod Impact ASTM D256. In some embodiments, the polymer has a toughness of from about 2.0 ft-lb/in to about 10.0 ft-lb/in, from about 3.0 ft-lb/in to about 10.0 ft-lb/in, from about 4.0 ft-lb/in to about 10.0 ft-lb/in, from about 5.0 ft-lb/in to about 10.0 ft-lb/in, from about 6.0 ft-lb/in to about 10.0 ft-lb/in, from about 7.0 ft-lb/in to about 10.0 ft-lb/in, from about 5.0 ft-lb/in to about 12.0 ft-lb/in, from about 6.0 ft-lb/in to about 12.0 ft-lb/in, from about 7.0 ft-lb/in to about 12.0 ft-lb/in, or from about 8.0 ft-lb/in to about 12.0 ft-lb/in, as measured by Notched Izod Impact ASTM D256.

In another embodiment, the concrete infused by the oligomeric solution comprises asphalt concrete or cement concrete. In some embodiments, the concrete is asphalt concrete. In some embodiments, the concrete is cement concrete. In some embodiments, the asphalt concrete comprises recycled materials. In some embodiments, the recycled materials comprise automobile tires. In some embodiments, the cement concrete comprises Portland cement, Masonry cement, Mortar cement, gypsum, calcium aluminate cement, hydratable alumina, hydratable aluminum oxide, colloidal silica, silicon oxide, magnesia, limestone, hydrated lime, pozzolans, fly ash, granulated blast furnace slag, metakaolin, rice hull ash, silica fume, oil well cementing grout, or hydraulic cement binder. In some embodiments, the cement concrete comprises Portland cement, fly ash, slag cement or combinations thereof. In some embodiments, the cement concrete comprises recycled materials. In some embodiments, the recycled materials comprise recycled cement concrete.

In another embodiment, the concrete of the present invention is used in the formation of a road or runway, a structural device or surface, an ornamental device or surface, or a preformed article. In some embodiments, the concrete used comprises cement concrete. In some embodiments, the concrete used comprises asphalt concrete.

In another embodiment, the concrete of the present invention is used to repair a damaged surface. In some embodiments, the damaged surface comprises a concrete surface. In some embodiments, the damaged concrete surface comprises a cement concrete or asphalt concrete surface. In some embodiments, the damaged concrete surface comprises a road or runway. In some embodiments, the damaged surface comprises a building or bridge surface. In some embodiments, the surface comprises a pothole or alligator crack. In some embodiments, the repair material of the method is approximately flush with the road surface instead of raised and overlaid, and said repair material is bonded to the road material and sealed against the entrance of water. In some embodiments, the material of the method is used to set the contour and height of the repair so that subsequent traffic does not change it. In some embodiments, the material of the method is used to set the height and contour of the repair so that softness on hot days does not cause rutting by traffic. In some embodiments, the material of the method is used for fast curing so that the roadway can be opened to traffic in a short amount of time.

In another embodiment, the method of improving the durability of concrete comprises adding said oligomeric material to at least one precursor to said concrete. In some embodiments, the oligomeric material is added to aggregate, then the oligomeric/aggregate mixture is combined with the asphalt or cement binder. In some embodiments, the oligomeric material is added to the binder, then the binder/oligomeric mixture is combined with the aggregate. In some embodiments, the oligomeric material is added to the complete concrete mixture prior to deposition.

In some embodiments, the oligomeric material replaces the binder in the concrete.

In some embodiments, the method comprises removal of material from a pothole, subsequent cleaning of the pothole (typically with pressurized air or water or another solvent), optionally spraying the oligomeric solution of the claimed invention into the pothole, filling said pothole with a concrete formulation, optionally waiting for concrete formulation to harden, spraying, pouring, or coating said concrete formulation with sufficient oligomeric solution to fill the voids in the material and/or prevent water from entering said concrete and/or increase the durability of the repair.

In another embodiment, the method comprises selectively depositing the oligomeric solution on concrete areas. Said selective deposition can be along, for example, travel lanes, bus routes, truck routes, or other areas that are heavily impacted and need additional durability. adding said oligomeric solution to said concrete prior to deposition of said concrete, spraying said oligomeric material on said concrete, or pouring said oligomeric material on said concrete.

In another embodiment, the present invention comprises a composition comprising a polymer formed by ROMP and concrete. In some embodiments, the concrete comprises asphalt concrete or cement concrete. In some embodiments, the polymer formed by ROMP comprises a cyclic olefin. In some embodiments, the polymer formed by ROMP comprises polyDCPD or polynorbornene. In some embodiments, the oligomeric solution forming the polymer formed by ROMP comprises a nanomolecular precursor and has a viscosity of less than about 200 cps and cures in less than about 24 hours. In some embodiments, the oligomeric solution forming the polymer formed by ROMP optionally includes solvent, optionally a catalyst, optionally an accelerator, and/or, optionally an initiator. In some embodiments, the composition further comprises additional polymers. In some embodiments, the additional polymers form copolymers or composites with the polymer formed by ROMP. In some embodiments, the additional polymers are polyesters or epoxies. In some embodiments, the additional polymers form cyclic olefin copolymers with the polymer formed by ROMP. In some embodiments, the polymer formed by ROMP has a toughness of greater than about 4.0, 5.0 6.0, 7.0, 8.0 or 9.0 ft-lb/in as measured by Notched Izod Impact ASTM D256. In some embodiments, the polymer has a toughness of from about 2.0 ft-lb/in to about 10.0 ft-lb/in, from about 3.0 ft-lb/in to about 10.0 ft-lb/in, from about 4.0 ft-lb/in to about 10.0 ft-lb/in, from about 5.0 ft-lb/in to about 10.0 ft-lb/in, from about 6.0 ft-lb/in to about 10.0 ft-lb/in, from about 7.0 ft-lb/in to about 10.0 ft-lb/in, from about 5.0 ft-lb/in to about 12.0 ft-lb/in, from about 6.0 ft-lb/in to about 12.0 ft-lb/in, from about 7.0 ft-lb/in to about 12.0 ft-lb/in, or from about 8.0 ft-lb/in to about 12.0 ft-lb/in, as measured by Notched Izod Impact ASTM D256.

In another embodiment, the present invention comprises a preformed article comprising concrete infused with a oligomeric solution having a viscosity of less than about 200 cps and curing in less than about 24 hours, comprising a nanomolecular precursor, and optionally a solvent, optionally a catalyst, optionally an accelerator, and/or, optionally an initiator; and forming a polymer having a toughness of greater than about 4.0, 5.0 6.0, 7.0, 8.0 or 9.0 ft-lb/in as measured by Notched Izod Impact ASTM D256.

In some embodiments, the present invention comprises a formed article comprising concrete and a polymer formed by ROMP. In some embodiments, the concrete comprises asphalt concrete or cement concrete. In some embodiments, the formed article comprises a component for use in the building or reinforcement of structures, such as buildings or bridges. In some embodiments the formed article comprises a component for use as in structures or barriers to reinforce military or secure areas. In some embodiments the formed article comprises a component for use in concrete barriers on highways. In some embodiments the formed article comprises a component for use as new or replacement sections of roads.

In some embodiments of the formed article, the polymer formed by ROMP comprises a cyclic olefin. In some embodiments, the polymer formed by ROMP comprises polyDCPD or polynorbornene. In some embodiments, the oligomeric solution forming the polymer formed by ROMP comprises a nanomolecular precursor and has a viscosity of less than about 200 cps and cures in less than about 24 hours. In some embodiments, the oligomeric solution forming the polymer formed by ROMP optionally includes solvent, optionally a catalyst, optionally an accelerator, and/or, optionally an initiator. In some embodiments, the composition further comprises additional polymers. In some embodiments, the additional polymers form copolymers or composites with the polymer formed by ROMP. In some embodiments, the additional polymers are polyesters or epoxies. In some embodiments, the additional polymers form cyclic olefin copolymers with the polymer formed by ROMP. In some embodiments, the polymer formed by ROMP has a toughness of greater than about 4.0, 5.0 6.0, 7.0, 8.0 or 9.0 ft-lb/in as measured by Notched Izod Impact ASTM D256. In some embodiments, the polymer has a toughness of from about 2.0 ft-lb/in to about 10.0 ft-lb/in, from about 3.0 ft-lb/in to about 10.0 ft-lb/in, from about 4.0 ft-lb/in to about 10.0 ft-lb/in, from about 5.0 ft-lb/in to about 10.0 ft-lb/in, from about 6.0 ft-lb/in to about 10.0 ft-lb/in, from about 7.0 ft-lb/in to about 10.0 ft-lb/in, from about 5.0 ft-lb/in to about 12.0 ft-lb/in, from about 6.0 ft-lb/in to about 12.0 ft-lb/in, from about 7.0 ft-lb/in to about 12.0 ft-lb/in, or from about 8.0 ft-lb/in to about 12.0 ft-lb/in, as measured by Notched Izod Impact ASTM D256.

Definitions

The following definitions apply to some of the aspects described with respect to some embodiments of the invention. These definitions may likewise be expanded upon herein.

As used herein, the singular terms "a," "an," and "the" include plural referents unless the context clearly dictates otherwise. Thus, for example, reference to an object can include multiple objects unless the context clearly dictates otherwise. The use of the word "a" or "an" when used in conjunction with the term "comprising" in the specification may mean "one," but it is also consistent with the meaning of "one or more," "at least one," and "one or more than one." The term "about" references all terms in the range unless otherwise stated. For example, about 1, 2, or 3 is equivalent to about 1, about 2, or about 3, and further comprises from about 1-3, from about 1-2, and from about 2-3.

The term oligomeric solution, as used herein, refers to the combination of a nanomolecular precursor with optionally, a catalyst, initiator, inhibitor, solvent, accelerator, curing agent, or combination thereof, and may further include other monomers, dimers, trimers, or oligomers that may polymerize by any means, or may include additional thermosetting or thermoplastic polymers. Preferably, the oligomeric solution comprises the nanomolecular precursor, a catalyst, and, optionally, an inhibitor.

The term "concrete" as used herein, describes a hardened mixture of a binder and an aggregate. In the case of cement concrete, the hardened mixture is typically formed by the chemical reaction of a binder with water in the presence of the aggregate. Asphalt concrete comprises the combination of asphalt as a binder with an aggregate to form a thermoplastic composition. A structural surface, as used herein, describes a concrete surface along with the interior of the concrete that is accessible to the oligomeric solution wherein the surface is part of a component of a building, concrete form, road, or the like that is structural or load bearing component. A ornamental surface, as used herein, describes a concrete surface along with the interior of the concrete that is accessible to the oligomeric solution wherein the surface is part of a component of a building, concrete form, road, or the like that is primarily ornamental, aesthetically pleasing and/or non-functional.

Binders include cements, such as Portland cement, Masonry cement, Mortar cement, and/or gypsum, calcium aluminate cement, hydratable alumina, hydratable aluminum oxide, colloidal silica, silicon oxide, magnesia, and may also include limestone, hydrated lime, pozzolans such as fly ash and/or granulated blast furnace slag, metakaolin, rice hull ash, and silica fume or other materials commonly included in such cements, and may also describe pastes, slurries, mortars, grouts, such as oil well cementing grouts and hydraulic cement binder. Further, in the case of asphalt cement, the binder is asphalt.

Aggregates in concrete play a dual role of acting as a filler and influencing the properties of the concrete material. Changes in gradation, maximum size, unit weight, and moisture content of the aggregate can all alter the character and performance of the concrete. Aggregates comprise as much as 60% to 80% of a typical cement concrete mix, and are selected to be durable, blended for optimum efficiency, and properly controlled to produce consistent concrete strength, workability, finishability, and durability. Aggregates as used herein, can include practically any material that meets these requirements for the intended use, and include sand, crushed rock or gravel, recycled materials, and polymers.

Nanomolecular precursor, as used herein, refers to discrete molecules that will subsequently react to form the polymers of embodiments of the present invention. The nanomolecular precursors of embodiments of the present invention include monomers, dimers, trimers, or oligomers, or combinations thereof. The nanomolecular precursors have a molecular length along their longest dimension of about 100 nm or less, 90 nm or less, 80 nm or less, 70 nm or less, 60 nm or less, 50 nm or less, 40 nm or less, 30 nm or less, 20 nm or less, 10 nm or less, 5 nm or less, 4 nm or less, 3 nm or less, 2 nm or less, 1.5 nm or less, 1.2 nm or less, 1 nm or less, 0.8 nm or less, or 0.6 nm or less, and down to about 0.4 nm or less. Alternatively, or in conjunction, the nanomolecular precursors have a molecular length along their longest dimension of about 0.4 nm to 100 nm, 0.4-90 nm, 0.4-80 nm, 0.4-70 nm, 0.4-60 nm, 0.4-50 nm, 0.4-40 nm, 0.4-30 nm, 0.4-20 nm, 0.4-10 nm, 0.4-5 nm, 0.4-4 nm, 0.4-3 nm, 0.4-2 nm, 0.4-1.5 nm, 0.4-1.2 nm, or 0.4-1 nm. Preferably, nanomolecular precursors are cyclic olefins that undergo ROMP. Preferably, nanomolecular precursors comprise monomers, dimers, trimers, and/or oligomers of cyclic olefins that undergo ROMP. More preferably, the cyclic olefins are monomers, dimers, and/or trimers of cyclopentadiene or are norbornene. Most preferably, the cyclic olefins are monomers, dimers, and/or trimers of cyclopentadiene. Dicyclopentadiene, as used herein, refers to both the chemical compound $C_{10}H_{12}$, as well as the temperature dependent combination of the DCPD with it the monomer cyclopentadiene.

The cyclic olefins of embodiments of the present invention may be combined with other monomers to form composites and/or copolymers. The term "cyclic olefins", as used herein, includes monocyclic compounds, along with polycyclic (both bridged and unbridged), homocyclic, and heterocyclic compounds. For example, DCPD can be used in composites to improve the performance of traditional unsaturated polyesters. In these modified polyester resins, the DCPD reacts with maleic acid and results in a higher $T_g$ and more rapid development of acceptable hardness. DCPD has low viscosity, thus allowing a reduction in the total amount of styrene, resulting in a reduction in volatile emissions and polymer shrinkage. DCPD also improves the cure of the resin when in an oxygen atmosphere, thus assisting in making the surface tack-free.

DCPD also can be used in the formation of epoxy composites. DCPD is polymerized in the backbone and epoxy groups are still on the ends for crosslinking. The addition of DCPD significantly improves the $T_g$ of the epoxy, raising it from 160° C. at 22% concentration to 180° C. at 28% concentration. Another modification to the formation of pure DCPD monomer is the copolymer between DCPD and butadiene. This gives a significant increase in toughness over what is already a tough polymer. Similar copolymers between DCPD and ethylene can be formed. The DCPD/butadiene and DCPD/ethylene copolymers are referred to as cyclic olefin copolymers (COCs), and, unlike DCPD alone, are thermoplastic.

ROMP polymers, as used herein, refers to polymers that undergo ring opening metathesis polymerization. ROMP is a variant of the olefin metathesis reaction. The reaction uses strained cyclic olefins to produce stereoregular and monodisperse polymers and co-polymers. The driving force of the reaction is relief of ring strain in cyclic olefins (e.g. norbornene or cyclopentadiene) The addition of substituents to the monomer and the choice of solvent can alter the molecular weight of the polymer produced.

The mechanism of the ROMP reaction involves an alkylidene catalyst and is similar to the mechanism of olefin metathesis with two important modifications. First, as the reaction involves a cyclic olefin, the "new" olefin that is generated remains attached to the catalyst as part of a growing polymer chain. The second difference is that the driving force for the ROMP reaction is the relief of ring strain. Therefore, the second step shown above is essentially irreversible. Olefins such as cyclohexenes or benzene have little or no ring strain and can not be polymerized because there is no thermodynamic preference for polymer versus monomer. Strained cyclic olefins have sufficient ring strain to make this process possible. Monomers based on norbornene derivatives are especially popular as they can be readily synthesized from Diels-Alder reactions with cyclopentadiene.

The polymers produced in the ROMP reaction typically have a very narrow range of molecular weights, something that is very difficult to achieve by standard polymerization methods such as free radical polymerization. The polydispersities (the weight average MW divided by the number average MW) are typically in the range of 1.03 to 1.10. These molecular weight distributions are so narrow the polymers are said to be monodisperse.

An important feature of this mechanism is that ROMP systems are typically living polymerization catalysts. For example, one can polymerize 100 equivalents of norbornene and then add a second monomer after the first one is consumed. ROMP is a superior method for making diblock and triblock co-polymers and permits one to tailor the properties of the resulting material. Such techniques are only possible if the ratio of chain initiation and chain propagation are perfectly balanced. Therefore, for functionalized monomers in particular, it is not uncommon to try several different catalysts, solvents, concentrations, temperatures etc. to achieve the best results.

Solvent, as used herein, refers to those aqueous or non-aqueous solutions that may be added to the oligomeric solution to obtain the desired viscosity and/or other desired properties. Preferably, solvents are non-aqueous, organic solvents.

Catalysts, as used herein, are substances that modify and increase the rate of a reaction without being consumed in the process. Catalysts of embodiments of the present invention include those catalysts that will form polymers with the claimed criteria. Catalysts include ROMP catalysts.

For some embodiments, catalysts of the present invention are ROMP catalysts. ROMP catalysts include Grubbs-type catalysts, Schrock-type catalysts, Piers-type catalysts, Hoveyda-type catalysts, Hoveyda-Grubbs-type catalysts, "black box" catalysts, and titanocene-based catalysts. "Black box" catalysts refers to heterogeneous catalysts including a high valent transition metal halide, oxide or oxo-halide with an alkylating co-catalyst such as an alkyl zinc or alkyl aluminum. Examples include $WCl_6/SnMe_4$ and $Re_2O_7Al_2O_3$. Titanocene-based catalysts refers to reaction of $Cp_2TiCl_2$ with two equivalents of $AlMe_3$ to yield $Cp_2Ti(\mu\text{-}Cl)(\mu\text{-}CH_2)AlMe_2$, also called Tebbe's Reagent (Cp=ferrocene; Me=methyl). In the presence of a strong base such as pyridine, the reagent is functionally equivalent to "$Cp_2Ti=CH_2$". These Ti-based catalysts are typically not nearly as active or tolerant of carbonyl functionalities as the later catalysts, but these Ti complexes undergo stoichiometric Wittig-like reactions with ketones, aldehydes and other carbonyls to form the corresponding methylene derivatives. While these catalysts are exceedingly active, they typically have low tolerance for functional groups because of their Lewis acidic nature.

For some embodiments, catalysts of embodiments of the present invention are ROMP catalysts that are air and moisture stable. Catalysts that meet these criteria include Grubbs-type catalysts, and ruthenium and osmium-based catalysts.

Accelerator, as used herein, refers to a compound added to the oligomeric solution that increases the polymerization or curing rate. Inhibitor as used herein, refers to a compound added to the oligomeric solution that decreases the polymerization or curing rate.

Initiator, as used herein, refers to a compound that decomposes into free radicals in the presence of monomers to begin a free radical polymerization process. Initiators may be used in conjunction with free radical addition polymerization reactions.

Viscosity, as used herein, describes a measure of the resistance of a fluid which is being deformed by either shear stress or tensile stress, and can relate to a dynamic viscosity of the fluid. In other words, viscosity describes a fluid's internal resistance to flow and may be thought of as a measure of fluid friction. Viscosity is measured with various types of viscometers and rheometers, and is measured in centipoise (cP).

Cure or curing, as used herein, refers to the toughening or hardening of a polymer material by polymerization or monomers and/or cross-linking of polymer chains, brought about by chemical additives, ultraviolet radiation, electron beam or heat. Generally, in the curing process, the resin viscosity drops initially upon the application of heat, passes through a region of maximum flow and begins to increase as the chemical reactions increase the average length and the degree of cross-linking between the constituent oligomers. This process continues until a continuous 3-dimensional network of oligomer chains is created—this stage is termed gelation. In terms of processability of the resin this marks an important watershed: before gelation the system is relatively mobile, after it the mobility is very limited, the micro-structure of the resin and the composite material is fixed and severe diffusion limitations to further cure are created.

Curing agents of embodiments of the present invention are substances or mixtures of substances added to the polymer composition to promote or control the curing reaction. They may be reactive or catalytic. A reactive curing agent or hardener is generally used in much greater amounts than a catalyst, and is actually incorporated into the resulting polymer. Promoters of embodiments of the present invention increase reactivity (shorter gel time and faster cure) of cure systems.

Thermoset, as used herein, is polymer material that irreversibly cures. A thermosetting polymer is a prepolymer in a soft solid or viscous state that changes irreversibly into an infusible, insoluble polymer network by curing. Curing can be induced by the action of a catalyst, heat or suitable radiation, or a combination of two or more of these. A cured thermosetting polymer is called a thermoset.

Thermoplastic, as used herein, is a polymer that turns to a liquid when heated to a sufficiently high temperature and freezes to a glassy state when cooled sufficiently. Most thermoplastics are high-molecular-weight polymers whose chains associate through weak Van der Waals forces (polyethylene); stronger dipole-dipole interactions and hydrogen bonding (nylon); or even stacking of aromatic rings (polystyrene). Thermoplastic polymers differ from thermosetting polymers in that they can be remelted and remoulded. Many thermoplastic materials are addition polymers; e.g., vinyl chain-growth polymers such as polyethylene and polypropylene.

Toughness, as used herein, is the measure of the energy a sample can absorb without breaking or other deformation. Various methods have been developed to quantify the toughness or impact resistance of polymers. There are two types of toughness—equilibrium toughness and impact toughness. Equilibrium toughness is so named because the speed of the tensile test is usually so slow that equilibrium conditions can be assumed. Under these conditions, the toughness can be related to the area under the stress-strain curve via integration of the curve describing the stress-strain. Generally, the toughness of a material is more important under dynamic conditions, as when a force is applied suddenly. Therefore, impact toughness is defined as the energy absorbed by a material under sudden impact. Impact toughness is dependent upon the ability of the material to internally deform. A number of tests have been developed to measure a materials impact toughness. These include the Charpy impact test (ASTM D-6110), the Izod impact test (ASTM D-256), the tensile impact test (ASTM-1822), and the dart drop impact test (ASTM D-5628). The Izod impact test employs a sample fixed at one end with the pendulum arm impacting the sample at the unsupported end with a notch on the same side of the sample and the sample held just below the notch.

Formed article, as used herein, describes a concrete product cast in a mold in a factory setting. Alternative terms include precast articles or preformed articles. The advantages of a formed article are superior quality control and mass production not achievable on site. Examples included precast or pre-formed concrete walls, barriers, blocks, posts, beams, road sections, bridge components, railroad ties, junction boxes, grate inlets, culverts, swimming pools or sections of swimming pools, foundations, security or safe rooms, crypts, modular housing, housing components (i.e., structural or aesthetic component that are integrated into the structure of a house or apartment), specialty products, architectural forms, or sculptures.

Also, as used herein, the words "preferred," "preferably," and "more preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

Discussion

Embodiments of the present invention may be used to improve the strength and/or durability of concrete in any situation. One particular application that is currently poorly addressed is that of pothole repair. The life of a repaired pothole is counted in days or months rather than in years. Pothole repair material, which normally comprise of discrete aggregates in a continuous phase of asphalt after compaction, can viewed as a structural composite. Therefore the short life of repaired potholes on asphalt-based pavements can be described below in a sequence of failure: weak bonding between asphalt and aggregates; presence of interconnected voids in the asphalt-aggregate mix; moisture, or water, penetrates into the repaired area and intercalates through the asphalt-aggregate mix via the interconnected voids and weakens the bonds (stripping) between asphalt and aggregates; initiation of cracks in the repaired area and propagation through voids or bond interfaces between asphalt and aggregates as the result of traffic stresses; pull out, or raveling, of weakly bonded aggregates from the asphalt phase from the surface and edge of the repair mixture as the result of the compressive, shear, bending and tensile stresses exerted on the repaired region, caused by the traffic loading, with or without an overlay on top; development of hairline cracks at multiple sites and formation of inch-width cracks; separation of a portion or the whole block of the repaired material from the original pothole follows; and finally, failure of the repaired region causes further damage to the edges of the original pavement and creates bigger potholes In view of the above failure sequence of the asphalt-aggregate composite and concrete-aggregate composites patching material for potholes, it is desirable that a strong bonding material is developed for use in the aggregate-asphalt mix, or aggregate and other continuous phase matrix materials. Because of the conditions roads are continually subjected to and the specific steps that result in the failure of pothole repair, the following properties are critical for a bonding material that could prolong the life of a pothole repair:

1. Capable of infiltrating into the voids of a compacted (throw-and-roll) or vibratory compacted (semi-permanent, Spraying-injection) asphalt-aggregate mix.
2. Reduction of continuous and interconnected voids within the aggregate composite mixture for increasing the strength of the repair material and preventing the water/moisture infusion through the thickness of the repair.
3. Reinforce the continuous phase of the aggregate composites by replacing or enhancing the soft asphalt continuous phase, and increases its strength and fracture toughness.
4. The "bonding" material should have one or more of the following properties:
   a. Compatible with asphalt.
   b. Low viscosity for penetration into the asphalt-aggregate mixture.
   c. Controllable curing time (harden time) for field application requirements.
   d. Adjustable viscosity for penetration depth control.
   e. High fracture toughness for energy absorbing without breakage.
   f. High compressive, shear and tensile strength.
   g. Moisture and water resistant.
   h. Moderate elongation.
   i. Has the potential of being used as the binder with aggregates. Variable viscosity if desired.
   j. Can also be applied as sealing material at the edge of the pothole repair.
   k. Non-toxic and environmental friendly.
   l. Ultra-violet resistance and ozone resistance.

In view of the above, embodiments described herein not only address the criteria identified, but further, are generally applicable to all concrete applications and provide improved durability and to both new and repaired concrete. Embodiments of the present invention can be applied as a method for pavement pothole repair patching. The method generally uses a low-viscosity oligomeric solution to infiltrate or infuse into the concrete. The oligomeric solution is then allowed to cure into a polymer with high toughness. The oligomeric solution comprises a nanomolecular precursor along with additional optional components, such as catalysts, initiators, accelerators, inhibitors, curing agents, solvents, and the like. Preferably, the nanomolecular precursors are cyclic olefins, and more preferably, the nanomolecular precursors are cyclic olefins that undergo ROMP. Cyclic olefins that undergo ROMP are desirable as they tend to have very low viscosities, have curing times that are controllable via the catalyst and oligomeric solution, and form incredibly tough polymers that retain their durability over the range of temperatures encountered under normal road use. Most preferably, the ROMP polymer is polyDCPD, optionally in combination with cyclopentadiene trimer. PolyDCPD is about 25% less dense than epoxy but is much tougher, particularly at low temperatures where toughness becomes a design issue. In addition, as a dimer, the very small rings (about 7 Å) slip over each other easily, resulting in very low viscosity; about that of water. DCPD and the cyclopentadiene trimer can be cured by a ROMP catalyst and be controlled by the amount of inhibitor and the cyclopentadiene trimer, from few seconds at room temperature, up to 24 hrs with heat cure. Further, the addition of substituents to the monomer and the choice of solvent can alter the molecular weight of the polymer produced.

The ROMP process is quite useful because a regular polymer with a regular amount of double bonds is formed. The resulting product can be subjected to partial or total hydrogenation or can be functionalized into more complex compounds. Further, copolymers, block copolymers, and composites may be created by reaction of ROMP-formed polymers, such as polyDCPD, with/subsequent to/prior to other ROMP-formed polymers, or by reaction in the presence of other types of polymers. The advantage to block or mixed copolymers or composites is that it allows another level of control with regard to the resulting polymers.

Additionally, for some embodiments, the strength and/or durability of concrete can be improved based on commercially-available ROMP-catalyzed polymers. Some examples of polymers that can be produced through ROMP catalysis are Vestenamer® or trans-polyoctenamer which is the metathetical polymer of cyclooctene; Norsorex® or polynorbornene; and Telene® and Metton®, which are polydicyclopentadiene catalysts produced in a side reaction of the polymerization of norbornene. A ruthenium-based catalyst produced by Materia, Inc. can be used as a ROMP catalysts for certain embodiments.

The methods of embodiments of the present invention allow the oligomeric solution to quickly and thoroughly infuse into the concrete, and then subsequently react. The infusion depth is a function of the void spacing in the concrete and the viscosity of the oligomeric solution. In the case of asphalt concrete, infusion through the entire material is possible. While not being bound by a specific theory, in asphalt concrete, the cured polymer acts like a cage, filing the voids in the asphalt and tying these voids together. In pothole repair, this is advantageous because it allows the fill material to essentially be "wired" into the old road surface via the polymer cage. Another embodiment is the use of cyclic olefins that diffuse into the existing road material as well as the pothole repair material, bonding the two and sealing against water penetration between them.

In the case of cement concrete, the infusion depth is dependent on the void spacing in the material, but is typically at least several millimeters. This infusion depth is sufficient to provide significant additional toughness and improve the durability of the concrete by preventing the intercalation of water into the concrete. While not being bound by a specific theory, it is believed that the polymer forms a cage-like form, connecting the voids in the concrete and sealing the surface. One specific embodiment of the present invention is the use of cyclic olefins that undergo ROMP, such as DCPD, for improving the durability of aggregate-asphalt base pothole repair materials or any aggregates that uses continuous binders including cements.

The polymer formed by embodiments of the present invention advantageously does the following:

1. Infiltrates the cold mixture of aggregate-asphalt, or neat aggregate in the form of a low viscosity liquid (oligomeric solution). The aggregate-asphalt mix before the compaction, or even after the roll compaction, still contains a high vol % of interconnected voids. After the oligomeric solution has infiltrated, cured and hardened, it will form a continuous network (i.e., mechanical cage) around the discrete aggregates through the mixture's pre-existing voids. This continuous network of structural cages can capsulate the aggregates with mechanical forces and prevent the aggregates from being unraveled out from asphalt under traffic stresses.
2. Forms a continuous mechanical cage network which will enable the prevention of moisture/water from sipping through the thickness of the repair material and mitigate its deleterious stripping effect on bonding.
3. Forms stronger bonds with aggregates than the bonds between asphalt and aggregates. (If the polymer is used as a single binder or a part of the binders with aggregates.)
4. Takes various types of traffic stresses and reduces the pull out of aggregates which are the main components bearing traffic forces.
5. Distributes and transfers load more evenly and efficiently among aggregates than the soft asphalt material
6. Takes elevated weather temperature without losing significant property degradation as asphalt does, due to its one-way thermoset polymerization.
7. Applicable in field and on-site for various sizes of potholes and cracks on asphalt-base and concrete-base pavements
8. Applicable as an edge sealing material for the pothole repair. The oligomeric solution can also penetrate the side walls and base of the surrounding pavement due to its low viscosity. This provides anchoring forces for the repair material to the original pavement.
9. Displaces water, preventing it from eroding the concrete. PolyDCPD typically does not undergo a phase change and has negligible contraction with lowered temperatures.
10. Is catalyzed to exhibit a strong exotherm, which could be used with minimal heating (such as from a propane torch applied to the center of the installed patch) to create a chain reaction and cure the entire patch.

A schematic of the infiltration of DCPD resin into the aggregate-asphalt composites is shown in FIG. 1. It shows the cured continuous caged network of DCPD polymer holding the aggregates through the connected voids in a packed aggregate mixture. The DCPD polymer viscosity can be adjusted in order to reach the depth desired and be cured to hardened state within controlled time.

The oligomeric solution concentration can be adjusted to any percentage in the patching material mix and can be used for any of the current and future pothole repair processes including but not limited to:

1. Throw-and-go and throw-and-roll process
2. Spray injection
3. Edge seal of throw-and-roll
4. Semi-permanent
5. Cement pothole rapid patching process
6. Seal of alligator cracks or similar types of pavement discontinuous defects
7. Pavement surface covers The oligomeric solution can be applied via spray on the surface and sides of any of the patching methods listed above. It can also be used as a premix with aggregates with or without asphalt or other types of binders.

While certain conditions and criteria are specified herein, it should be understood that these conditions and criteria apply to some embodiments of the disclosure, and that these conditions and criteria can be relaxed or otherwise modified for other embodiments of the disclosure.

While the invention has been described with reference to the specific embodiments thereof, it should be understood by those skilled in the art that various changes may be made and equivalents may be substituted without departing from the true spirit and scope of the invention as defined by the appended claim(s). In addition, many modifications may be made to adapt a particular situation, material, composition of matter, method, or process to the objective, spirit and scope of the invention. All such modifications are intended to be within the scope of the claim(s) appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention. Finally, the entire disclosures of all references cited in this application are incorporated by reference.

What is claimed is:

1. A method of repairing an asphalt concrete road pavement, comprising:
   1) filling a pothole of the asphalt concrete road pavement with asphalt concrete comprising a mixture of asphalt and aggregates;
   2) compacting the asphalt concrete comprising the mixture of asphalt and aggregates in the pothole of the asphalt concrete road pavement;
   3) infusing the asphalt concrete comprising the mixture of asphalt and aggregates with an oligomeric solution comprising:
      a mixture of dimers and trimers of a cyclic olefin;
      wherein the oligomeric solution:
      (i) has a viscosity of no greater than 20 cps; and
      (ii) cures in less than 10 minutes; and
   4) forming a thermoset polymer from the oligomeric solution,
      wherein the thermoset polymer has:
      (i) a toughness of greater than 6.0 ft-lbs/in as measured by Notched Izod Impact ASTM D256; and
      wherein the asphalt concrete comprising the mixture of asphalt and aggregates is approximately flush with a road surface of the asphalt concrete road pavement; and
      wherein infusing the asphalt concrete comprising the mixture of asphalt and aggregates with the oligomeric solution is carried out subsequent to compacting the asphalt concrete comprising the mixture of asphalt and aggregates.

2. The method of claim 1, wherein the cyclic olefin is cyclopentadiene.

3. The method of claim 1, wherein the oligomeric solution comprises a ring opening metathesis polymerization catalyst.

4. The method of claim 3, wherein the ring opening metathesis polymerization catalyst is a Grubbs catalyst.

5. The method of claim 1, wherein the thermoset polymer is formed by ring opening metathesis polymerization, and the thermoset polymer comprises polydicyclopentadiene.

6. The method of claim 1, wherein infusing the asphalt concrete comprising the mixture of asphalt and aggregates with the oligomeric solution comprises infusing the oligomeric solution through an entire thickness of the asphalt concrete comprising the mixture of asphalt and aggregates.

7. The method of claim 1, wherein infusing the asphalt concrete comprising the mixture of asphalt and aggregates with the oligomeric solution comprises infusing an edge of the asphalt concrete comprising the mixture of asphalt and aggregates with the oligomeric solution, such that the thermoset polymer seals the edge against infusion of water and bonds the asphalt concrete comprising the mixture of asphalt and aggregates to the asphalt concrete road pavement.

8. The method of claim 1, wherein forming the thermoset polymer comprises forming a network of the thermoset polymer extending through interconnected voids among the aggregates.

9. The method of claim 1, wherein the thermoset polymer is formed by ring opening metathesis polymerization, and the thermoset polymer has a polydispersity in a range of 1.03 to 1.10.

* * * * *